(12) United States Patent
Zeltwanger et al.

(10) Patent No.: US 11,742,786 B2
(45) Date of Patent: Aug. 29, 2023

(54) METHOD FOR CONTROLLING AN INVERTER

(71) Applicant: Robert Bosch GmbH, Stuttgart (DE)

(72) Inventors: Thomas Zeltwanger, Ingersheim (DE); Wolfgang Michael Bischof, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 17/426,285

(22) PCT Filed: Jan. 13, 2020

(86) PCT No.: PCT/EP2020/050621
§ 371 (c)(1),
(2) Date: Jul. 28, 2021

(87) PCT Pub. No.: WO2020/156782
PCT Pub. Date: Aug. 6, 2020

(65) Prior Publication Data
US 2021/0391818 A1 Dec. 16, 2021

(30) Foreign Application Priority Data

Jan. 28, 2019 (DE) ...................... 10 2019 200 992.1

(51) Int. Cl.
*H02P 27/08* (2006.01)
*H02P 23/28* (2016.01)
(Continued)

(52) U.S. Cl.
CPC ............ *H02P 27/085* (2013.01); *B60L 3/003* (2013.01); *B60L 15/06* (2013.01); *H02P 23/28* (2016.02);
(Continued)

(58) Field of Classification Search
CPC .......... H02P 27/085; H02P 23/28; H02P 6/10; H02P 6/34; H02P 21/0021;
(Continued)

(56) References Cited

U.S. PATENT DOCUMENTS 9,543,885 B2 * 1/2017 Saha ...................... H02P 27/085
10,693,410 B2 * 6/2020 Yoshida .................. B60L 50/51
(Continued)

FOREIGN PATENT DOCUMENTS

CN 103683901 A 3/2014
DE 102011119644 A1 5/2013
(Continued)

OTHER PUBLICATIONS

Translation of International Search Report for Application No. PCT/EP2020/050621 dated Apr. 2, 2020 (2 pages).

*Primary Examiner* — David Luo
(74) *Attorney, Agent, or Firm* — Michael Best & Friedrich LLP

(57) ABSTRACT

The invention relates to a method for controlling an inverter which is electrically connected to an electric motor, having the following steps: defining a modulated voltage (S1) for the inverter, said voltage being based on a first switching frequency, for operating the electric motor with a current, wherein the current has an electric frequency; determining the electric frequency (S2); changing the first switching frequency (S4) on which the modulated voltage is based to a second switching frequency if a value pair consisting of electric frequency and first switching frequency, or a value pair consisting of electric frequency and a sideband of the first switching frequency, is within at least one defined disturbance range (S3).

14 Claims, 4 Drawing Sheets

(51) Int. Cl.
*B60L 3/00* (2019.01)
*B60L 15/06* (2006.01)

(52) U.S. Cl.
CPC ... *B60L 2240/427* (2013.01); *B60L 2240/429* (2013.01); *B60L 2240/526* (2013.01)

(58) Field of Classification Search
CPC ............. H02P 21/0025; H02P 23/0027; H02P 23/0031; H02P 29/50; B60L 3/003; B60L 15/06
USPC .................................................. 318/461, 445
See application file for complete search history.

(56) References Cited

U.S. PATENT DOCUMENTS

| | | |
|---|---|---|
| 2008/0298785 A1 | 12/2008 | Patel et al. |
| 2009/0115362 A1 | 5/2009 | Saha et al. |
| 2014/0084829 A1 | 3/2014 | Sung et al. |

FOREIGN PATENT DOCUMENTS

| | | |
|---|---|---|
| DE | 102014208384 A1 | 11/2014 |
| EP | 3007345 A1 | 4/2016 |
| JP | 2009284719 A | 12/2009 |
| WO | 2018181332 A1 | 11/2018 |

\* cited by examiner

METHOD FOR CONTROLLING AN INVERTER

BACKGROUND OF THE INVENTION

The invention relates to a method for controlling an inverter that is connected to an electric motor, wherein the operation of this unit within interference ranges is avoided.

Operating-point-dependent oscillations, and therefore sound emissions, and also other oscillations that have an adverse effect on the system and can be disruptive or unpleasant for users, can arise in and on drive systems, for example for electric vehicles. These sound emissions and other disruptive oscillations in general are therefore decreased or avoided by way of methods for reducing the sound emissions and oscillations in general. Other adverse oscillations in a system could be, among other things, oscillations on the signals in a signal processor, mechanical vibrations, electrical oscillations, electromagnetic oscillations, etc. In addition to the noise, they also have an adverse effect on the loading of components or the service life and the quality of signal processing.

Oscillations of this kind are typically reduced by damping measures or insulating measures. Constructional measures that change the rigidity of assemblies, for example, can also be used. If appropriate, target specifications are also modified to lessen noise.

The document DE 10 2014 208 384 describes a drivetrain and a method for reducing gear meshing noise in an electrically drivable drivetrain with a gear transmission and an electric motor.

The method comprises the steps: determining an operating state of the drivetrain; reading a data record associated with the determined operating state from a data memory; and adapting a torque of the electric motor in accordance with the data record.

SUMMARY OF THE INVENTION

The object of the invention is to specify an alternative method for controlling an inverter in order to reduce or entirely avoid the interference in certain interference ranges.

According to the invention, a method for controlling an inverter, a computer program product, a computer-readable storage medium, a control unit for controlling an inverter and a vehicle having an electric motor and an inverter are specified, at least some of which have the above-mentioned effects.

The invention is based on the knowledge that multiple types of interference in the form of oscillations, surface vibrations or even electrical oscillations are excited by frequencies of sidebands of modulated frequencies, such as modulation of the switching frequency of an inverter by the electrical frequency or by multiples of the electrical frequency at certain switching frequencies, or simply occur in certain frequency bands. When an inverter with variable switching frequency is used, a critical interference range of this kind can therefore be optionally avoided and the cause therefore eliminated.

The method according to the invention for controlling an inverter that is electrically connected to an electric motor stipulates, in one step, a modulated voltage for the inverter that is based on a first switching frequency in order to operate the electric motor using a current, wherein the current then has an electrical frequency.

This electrical frequency is determined in a further step and the first switching frequency, on which the modulated voltage is based, is changed to a second switching frequency when a value pair comprising electrical frequency and first switching frequency or a value pair comprising electrical frequency and a sideband of the first switching frequency lies within at least one defined interference range.

An interference range of this kind may, for example, have been determined in an analysis preceding use of the method, or can also be calculated when there are known relationships between system parameters. Interference ranges of this kind defined by the switching frequency ranges together with electrical frequency ranges can be stored in tables, for example. With this method, the optimum use of an inverter decreases switching frequencies, for example the sound emission. Other oscillations that have an adverse effect on the system can also be decreased or avoided. Electrical oscillations on signal lines can also have an adverse impact on one of the control circuits of the drive, for example.

According to a further configuration of the invention, it is proposed that the sideband comprises all the value pairs comprising electrical frequency and first switching frequency that satisfy function 1:

$$f_{WPM,}(f_{el}) = (f_{WPM,0} \pm k_1 \cdot f_{el}, k_1 \Box N).$$

Since the sideband is dependent on the electrical frequency, it can be predicted when a sideband will lie within a defined interference range. The switching frequency can therefore actually be changed in advance and the interference range can therefore be sidestepped.

According to a measure that improves the invention, it is proposed that the defined interference range is formed by virtue of an integer multiple of the electrical frequency being equal to the first switching frequency. Since this allows an interference range to be acquired mathematically, it is possible to avoid the interference range in this case.

According to a further configuration of the invention, it is proposed that a defined interference range is defined within the two limit lines by formula 2:

$$f_{WPM} = (k_2 \pm \Delta) \cdot f_{el} k_2 \Box N.$$

The interference range here is stipulated as a range A around a multiple of the electrical frequency. When oscillations from a system, for example comprising inverter and electric motor, can be described with this interference range, it is possible to sidestep this range, and therefore avoid interference oscillations, at a given electrical frequency by means of suitable selection of the switching frequency.

According to a further configuration of the invention, it is proposed that the interference range is defined by stored value pairs comprising electrical frequency and first switching frequency. This is necessary when the interference cannot simply be described mathematically, but instead ranges of identified interference determined from preliminary tests have to be stored using assignment tables, for example.

According to a measure that improves the invention, it is proposed that the first switching frequency is changed to the second switching frequency when a sensor signal from a component of a unit to which the inverter is assigned leaves a certain target value range or reaches a critical value range.

With this configuration, interference ranges can also be identified during operation and, by changing the switching frequency, a range for the switching frequency in which no interference or less interference arises can be identified.

According to a measure that improves the invention, it is proposed that the first switching frequency is changed to the second switching frequency when, on the basis of present driving states of a vehicle to which the inverter is assigned, an interference range is expected to be encountered during further driving operation. In this case, through predictive calculations, for example, it can be estimated whether the value pair comprising electrical frequency and first switching frequency or the value pair comprising electrical frequency and a sideband of the first switching frequency will lie within one of the interference ranges defined above. If, for example, an acceleration process is identified, it can be expected that this will be maintained for a certain time and the associated changes in the electrical frequency can be gauged. If there is an interference range in this prediction range, it can be optionally sidestepped by means of suitable selection of the switching frequency.

According to a further configuration of the invention, it is proposed that the second switching frequency is derived, in accordance with a rule, from the value pair comprising the first switching frequency and the electrical frequency. For many systems the expectation is that it is possible to gauge from the outset how large the interference range is, such that specific rules can be established regarding what choice of second frequency is suitable for getting out of the interference range.

According to a further configuration of the invention, it is proposed that the second switching frequency is determined from the first switching frequency by increasing or decreasing the first switching frequency by a predefined value. This simple rule can also be used iteratively when the selected second frequency lies in an interference range again.

According to a further configuration of the invention, it is proposed that the second switching frequency is selected depending on a change in successive different switching frequencies over time. When inverters with variable switching frequency are used, the switching frequency can be changed continuously for the most energy-saving operation possible, for example, such that a series of switching frequencies arises over time. The information regarding the speed of the change in the switching frequencies can therefore also be used to predict a favorable change of switching frequency.

According to a further configuration of the invention, it is proposed that, before the first switching frequency is changed, a check is performed to determine whether the value pair comprising electrical frequency and second switching frequency or the value pair comprising electrical frequency and a sideband of the second switching frequency lies within one of the interference ranges defined above.

Therefore, at least for the known interference ranges, a control frequency outside of the interference ranges can be determined using a simple iterative strategy.

According to the invention, a computer program product is specified that comprises commands that, during execution of the program by a computer, cause the latter to carry out the method as described above.

According to the invention, a computer-readable storage medium is specified that comprises commands that, during execution by a computer, cause the latter to carry out the method described above.

Furthermore, according to the invention, a control unit for controlling an inverter is specified that is electrically connected to an electric motor. The control unit has a voltage modulator that is configured to provide a modulated voltage for the inverter, by means of a first switching frequency, for operating the electric motor using a current that has an electrical frequency. A computing unit determines the electrical frequency and a changeover switch of the control unit is configured to change the first switching frequency for the voltage modulator to a second switching frequency when the value pair comprising electrical frequency and first switching frequency or the value pair comprising electrical frequency and a sideband of the first switching frequency lies within at least one defined interference range.

According to the invention, a vehicle is specified, having an electric motor, an inverter for operating the electric motor that is electrically connected to the electric motor, and a control unit for controlling the inverter, as described above.

BRIEF DESCRIPTION OF THE DRAWINGS

Exemplary embodiments of the invention are depicted in FIGS. 1 and 2 and are explained in more detail below. In the figures.

DETAILED DESCRIPTION

Figure 1:
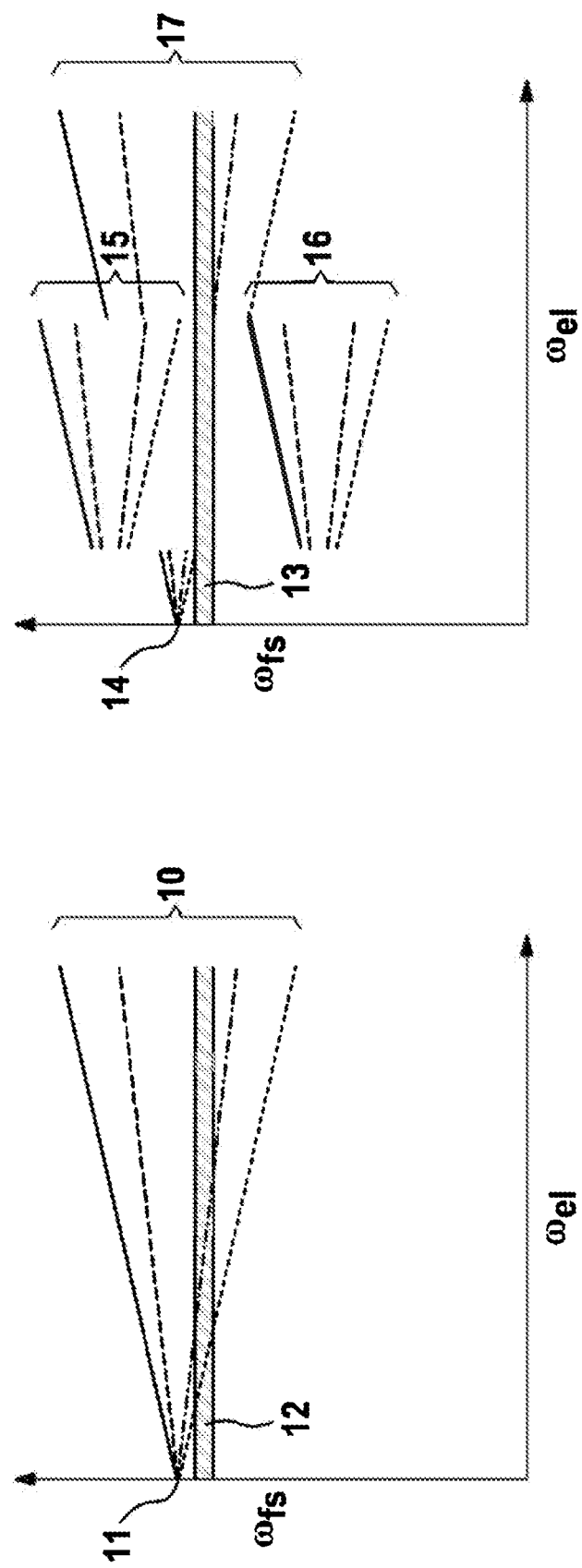
FIG. 1a shows an example of a sideband overlapping an interference range.
FIG. 1b shows an example of the switching frequency changing when a sideband reaches an interference range.

FIG. 1a shows, based on the switching frequency when the value of the electrical frequency is zero 11, how the sidebands 10 shown diverge and overlap the interference range 12. The interference range can be a natural frequency band of an electric drivetrain, for example. In this case, the switching frequency ωfs is plotted against the electrical frequency ωel. The characteristic of the sidebands can be described by formula 1: $f_{WPM}(f_{el})=(f_{WPM,0} \pm k_1 * f_{el}, k_1 \in \mathbb{N})$. In said formula, $f_{WPM}(f_{el})$ is the value pair comprising electrical frequency $f_{el}$ and switching frequency $f_{WPM}$ that lies on the straight line described by: $f_{WPM,0} \pm k_1 * f_{el}$. Here, $f_{WPM,0}$ is the switching frequency 11 itself and k1 is a whole number $k_1 \in \mathbb{N}$.

FIG. 1b shows how the switching frequency $f_{WPM,0}$ 14 can be varied in order to prevent the sidebands from overlapping the interference range. As can be seen, the switching frequency can be increased, which results in a family of curves 15 above the interference range 13, or also decreased, as can be seen in the family of curves 16. When the relevant sidebands 17 of the original switching frequency 14 have left the interference range 13, it is possible to return to the original switching frequency 14 again.

This method can therefore be used to avoid interference in the form of oscillations or sound emissions, for example, or even electrical interference that is caused by the electrical frequencies or switching frequencies.

Figure 2:
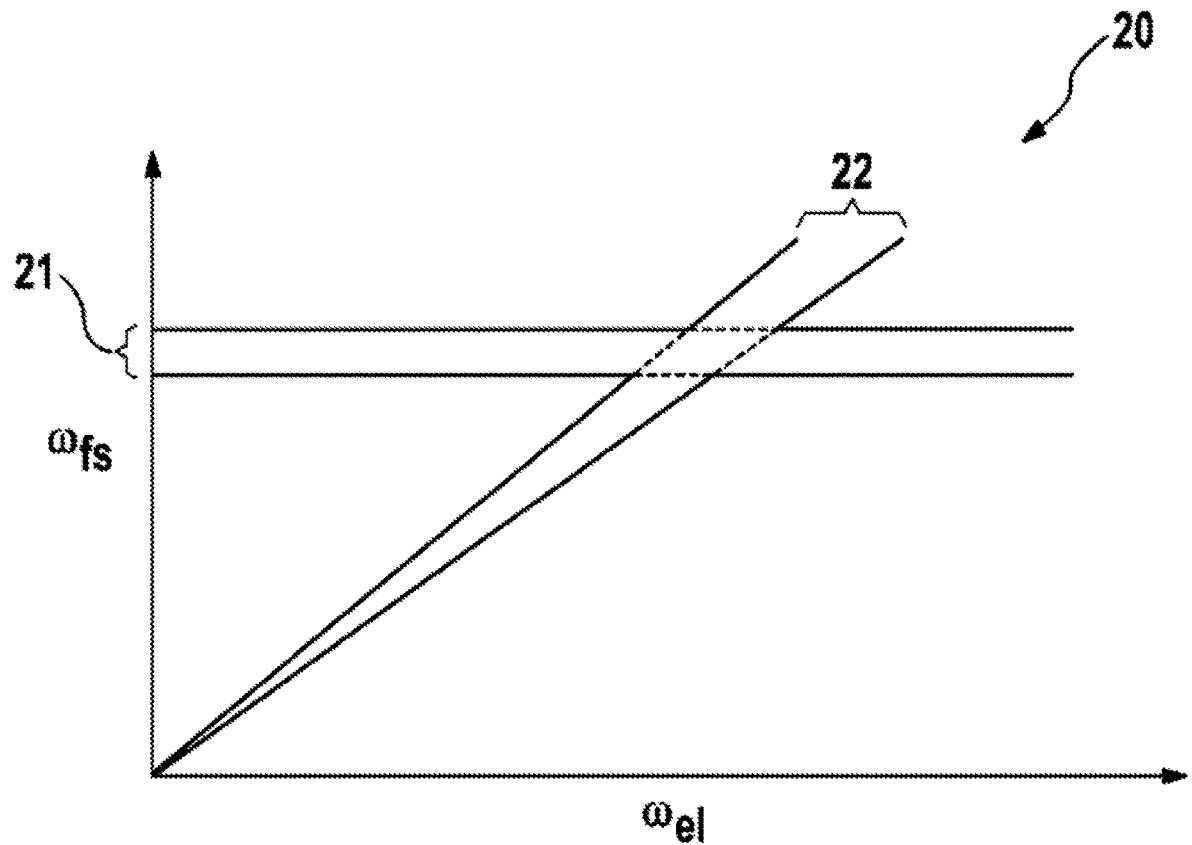
FIG. 2 shows different interference ranges.

In addition to the constant interference range 21 that is in the form of a band and known from FIG. 1, FIG. 2 also shows an interference range 22 that increases in a manner proportional to the electrical frequency and defines an angle. This interference range can be described by formula 2:

$$f_{WPM} = (k_2 \pm \Delta)^* f_{el} \quad k_2 \in \mathbb{N}.$$

The factor $k_2 \in N$ represents a natural number and the $\Delta$ forms the angle of the interference range. Interference ranges of this kind can arise from vibratory systems with a multiple of a fundamental frequency, for example.

Figure 3:
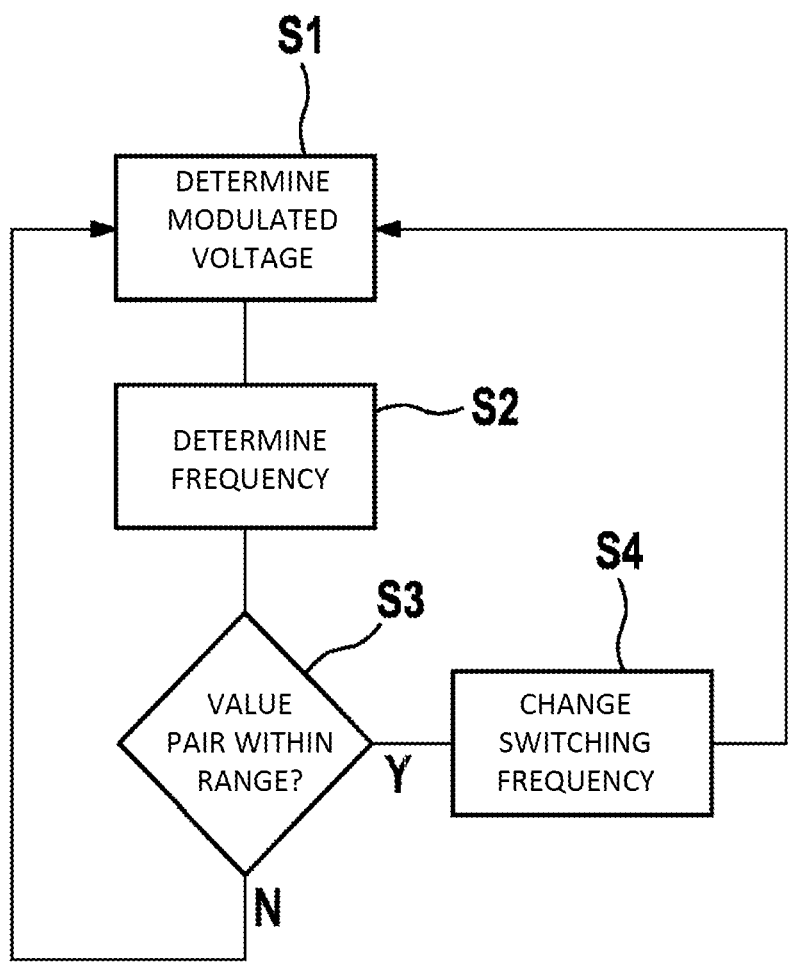
FIG. 3 shows the sequence of a method.

FIG. 3 shows the sequence of the method. In step S1, a modulated voltage, based on a first switching frequency, for the inverter is stipulated that is used to operate the electric motor using a current that has an electrical frequency.

In step S2 the electrical frequency of the current of the electric motor is determined.

In S3 a check is performed to determine whether the value pair comprising electrical frequency and first switching frequency or the value pair comprising electrical frequency and a sideband of the first switching frequency lies within at least one defined interference range.

If the check in S3 is true, in step S4 the first switching frequency, on which the modulated voltage was previously based, is changed to a second switching frequency. Otherwise, the first switching frequency remains the same. In both cases the method can start again at S1.

Figure 4:
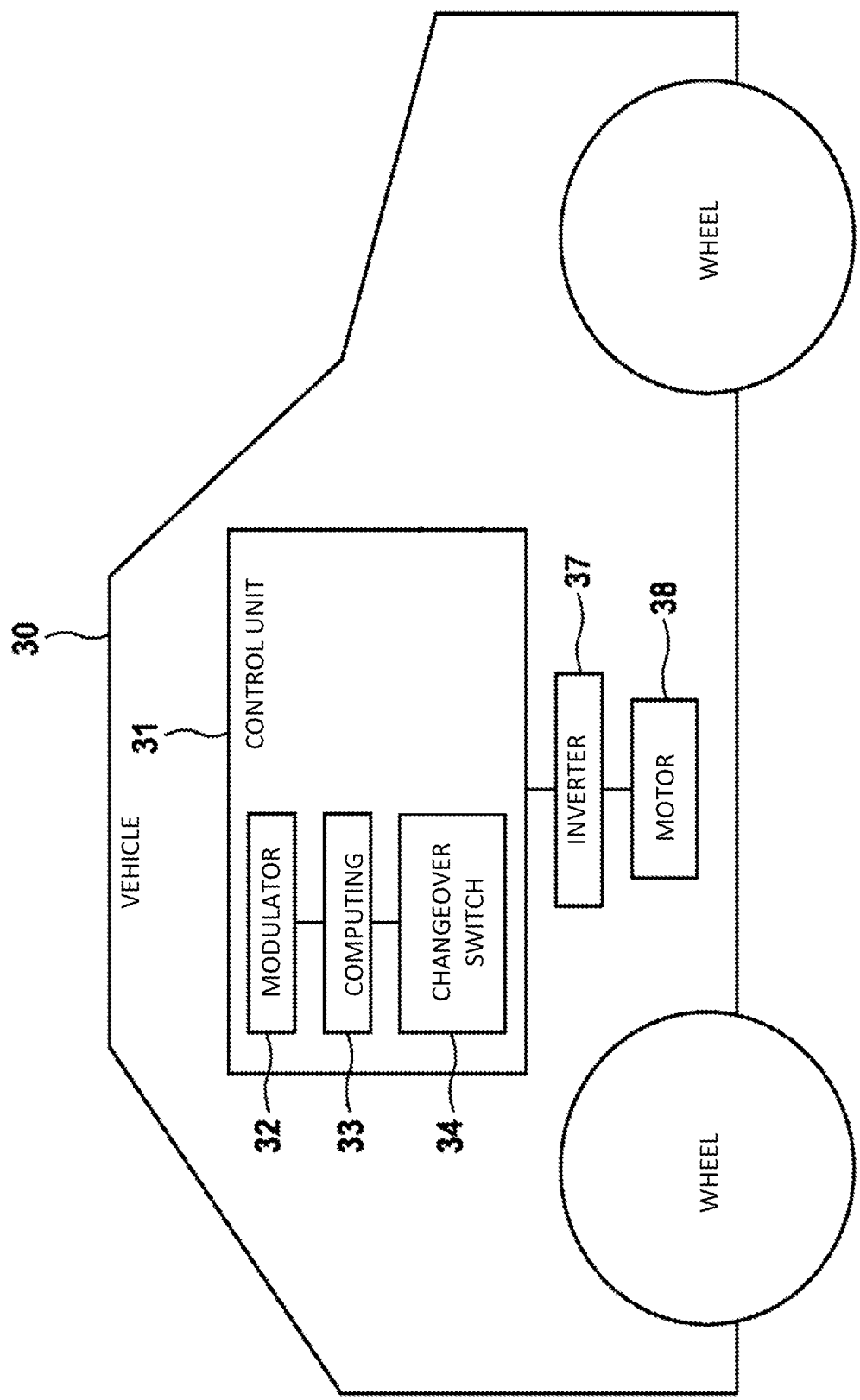
FIG. 4 shows a vehicle having an electric motor and an inverter.

FIG. 4 shows a vehicle 30 having an electric motor 38 and an inverter 37 for operating the electric motor 38 that is electrically connected to the electric motor 38. The vehicle 30 also contains a control unit 31 for controlling the inverter 37. The control unit 31 has a voltage modulator 32 that is configured to provide a modulated voltage for the inverter 37, by means of a first switching frequency, for operating the electric motor 38 using a current with an electrical frequency.

Furthermore, the control unit 31 has a computing unit 33 for determining the electrical frequency. A changeover switch 34 of the control unit 31 is configured to change the first switching frequency for the voltage modulator 32 to a second switching frequency when the value pair comprising electrical frequency and first switching frequency lies within at least one defined interference range.

The invention claimed is:

1. A method for controlling an inverter that is electrically connected to an electric motor, the method comprising the steps:
stipulating a modulated voltage (S1), based on a first switching frequency, for the inverter in order to operate the electric motor using a current, wherein the current has an electrical frequency;
determining the electrical frequency (S2); and
changing the first switching frequency (S4), on which the modulated voltage is based, to a second switching frequency when a value pair comprising electrical frequency and first switching frequency or a value pair comprising electrical frequency and a sideband of the first switching frequency lies within at least one defined interference range (S3).

2. The method as claimed in claim 1, wherein the sideband comprises all the value pairs comprising electrical frequency and first switching frequency that satisfy formula 1:

$$f_{WPM,}(f_{el}) = (f_{WPM,0} \pm k_1 * f_{el}, k_1 \in N).$$

3. The method as claimed in claim 1, wherein the defined interference range is formed by virtue of an integer multiple of the electrical frequency being equal to the first switching frequency.

4. The method as claimed in claim 1, wherein the defined interference range is stipulated by formula 2:

$$f_{WPM} = (k_2 \pm \Delta)^* f_{el} \quad k_2 \in N.$$

5. The method as claimed in claim 1, wherein the interference range is defined by stored value pairs comprising electrical frequency and first switching frequency.

6. The method as claimed in claim 1, wherein the first switching frequency is changed to the second switching frequency when a sensor signal from a component of a unit to which the inverter is assigned leaves a certain target value range or reaches a critical value range.

7. The method as claimed in claim 1, wherein the first switching frequency is changed to the second switching frequency when, on the basis of present driving states of a vehicle to which the inverter is assigned, it is expected through predictive calculations that the value pair comprising electrical frequency and first switching frequency or the value pair comprising electrical frequency and a sideband of the first switching frequency will lie within an interference range.

8. The method as claimed in claim 1, wherein the second switching frequency is derived, in accordance with a rule, from the value pair comprising the first switching frequency and the electrical frequency.

9. The method as claimed in claim 8, wherein, before the first switching frequency is changed, a check is performed to determine whether the value pair comprising electrical frequency and second switching frequency or the value pair comprising electrical frequency and a sideband of the first switching frequency lies within an interference range.

10. The method as claimed in claim 1, wherein the second switching frequency is determined from the first switching frequency by increasing or decreasing the first switching frequency by a predefined value.

11. The method as claimed in claim 1, wherein the second switching frequency is selected depending on a change in successive different switching frequencies over time.

12. A non-transitory, computer-readable storage medium comprising commands that, during execution by a computer, cause the latter to control an inverter that is electrically connected to an electric motor by:
stipulating a modulated voltage (S1), based on a first switching frequency, for the inverter in order to operate the electric motor using a current, wherein the current has an electrical frequency;
determining the electrical frequency (S2); and
changing the first switching frequency (S4), on which the modulated voltage is based, to a second switching frequency when a value pair comprising electrical frequency and first switching frequency or a value pair comprising electrical frequency and a sideband of the first switching frequency lies within at least one defined interference range (S3).

13. A control unit (31) for controlling an inverter (37) that is electrically connected to an electric motor (38), wherein the control unit (31)
has a voltage modulator (32) that is configured to provide a modulated voltage for the inverter (37), by means of a first switching frequency, for operating the electric motor (38) using a current that has an electrical frequency;
has a computing unit (33) for determining the electrical frequency; and has a changeover switch (34), wherein the changeover switch (34) is configured to change the first switching frequency for the voltage modulator (32) to a second switching frequency when the value pair comprising electrical frequency and first switching frequency lies within at least one defined interference range.

14. A vehicle having an electric motor (38), an inverter (37) for operating the electric motor (38) that is electrically connected to the electric motor, and a control unit (31) for controlling the inverter (37), wherein the control unit (31) has a voltage modulator (32) that is configured to provide a modulated voltage for the inverter (37), by means of a first switching frequency, for operating the electric motor (38) using a current that has an electrical frequency;

a computing unit (33) for determining the electrical frequency; and a changeover switch (34), wherein the changeover switch (34) is configured to change the first switching frequency for the voltage modulator (32) to a second switching frequency when the value pair comprising electrical frequency and first switching frequency lies within at least one defined interference range.

* * * * *